(12) United States Patent
Benson et al.

(10) Patent No.: US 8,353,743 B1
(45) Date of Patent: Jan. 15, 2013

(54) STUFFER HORN WITH SPRAY

(75) Inventors: Shaughn M. Benson, Pierson, IA (US); Adam Pfeifer, Dakota Dunes, SD (US)

(73) Assignee: Tyson Foods, Inc., Springdale, AR (US)

( * ) Notice: Subject to any disclaimer, the term of this patent is extended or adjusted under 35 U.S.C. 154(b) by 0 days.

(21) Appl. No.: 13/344,606

(22) Filed: Jan. 5, 2012

(51) Int. Cl.
*A22C 11/00* (2006.01)
(52) U.S. Cl. .......................................... 452/45
(58) Field of Classification Search .............. 452/21–26, 452/30–32, 35–37, 45–48, 51
See application file for complete search history.

(56) References Cited

U.S. PATENT DOCUMENTS

| | | | | |
|---|---|---|---|---|
| 3,594,856 A | * | 7/1971 | Michl | 452/32 |
| 3,877,361 A | * | 4/1975 | Trainor et al. | 99/478 |
| 4,689,237 A | * | 8/1987 | Fabre | 426/521 |
| 4,905,587 A | * | 3/1990 | Smithers | 99/534 |
| 5,335,480 A | * | 8/1994 | Zaeske et al. | 53/431 |
| 5,484,001 A | * | 1/1996 | Gray | 141/114 |
| 5,887,415 A | * | 3/1999 | Matthews et al. | 53/576 |
| 6,283,846 B1 | * | 9/2001 | Townsend | 452/27 |
| 6,846,234 B1 | * | 1/2005 | Hergott et al. | 452/32 |
| 7,044,845 B2 | * | 5/2006 | Coutandin et al. | 452/30 |
| 7,955,164 B2 | * | 6/2011 | Wince et al. | 452/30 |

* cited by examiner

*Primary Examiner* — Richard Price, Jr.
(74) *Attorney, Agent, or Firm* — Mark E. Stallion; Husch Blackwell LLP

(57) ABSTRACT

An embodiment of the invention includes a stuffer horn with spray system for elimination or reduction of pathogen contamination. One embodiment of the invention combines a stuffer horn with spray nozzles for the application of a safety intervention solution while the product is being placed into a bag. The stuffer comprises a horn with pivoting top jaw and fixed bottom jaw that funnels product into a bag that is placed over its nose and a cylinder that forces the product through the horn and into the bag. One implementation can include a cylindrical horn having a flexible overlapping side wall adapted to increase or decrease the inner diameter.

20 Claims, 7 Drawing Sheets

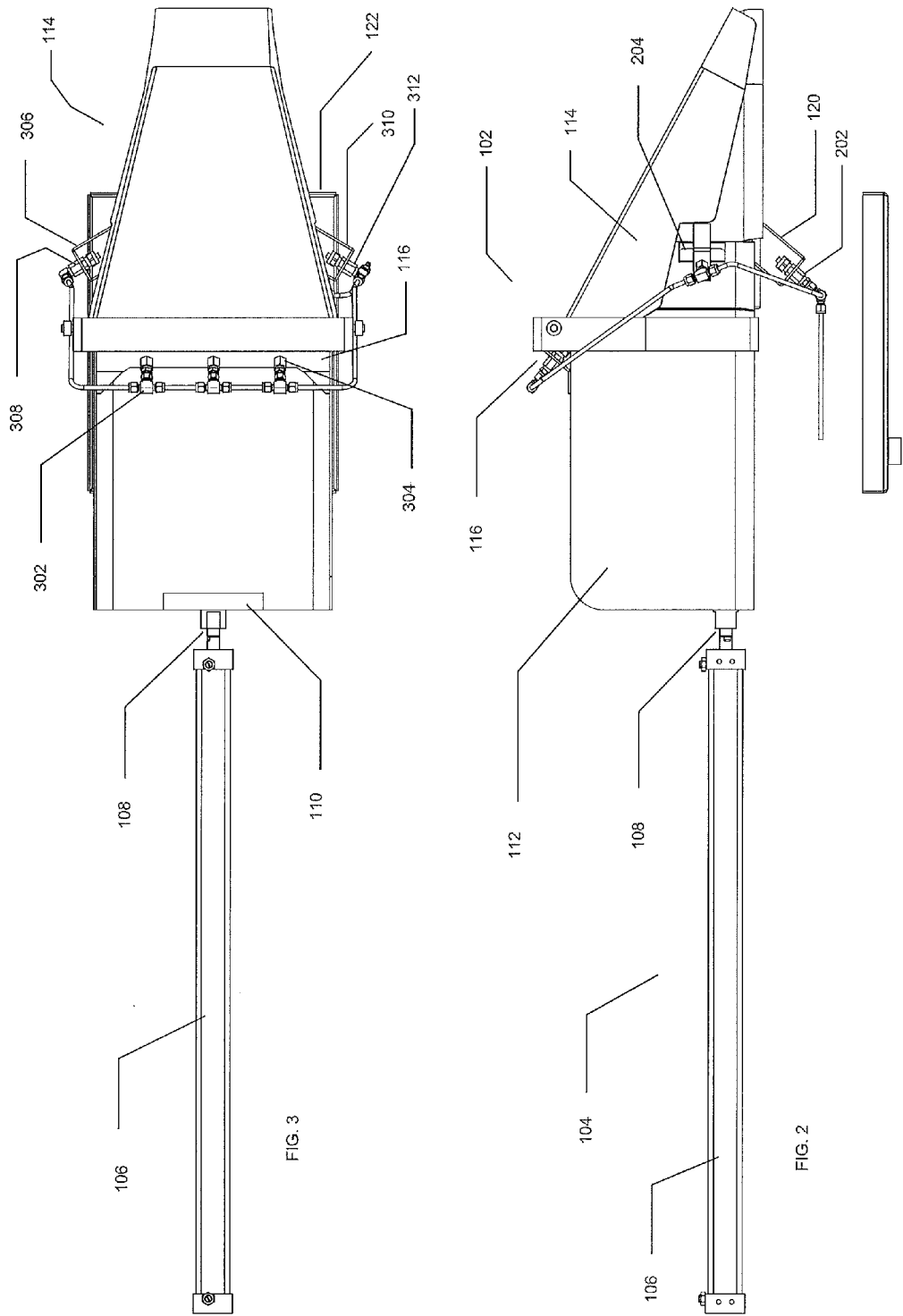

STUFFER HORN WITH SPRAY

BACKGROUND OF INVENTION

1. Field of Invention

Figure 1:
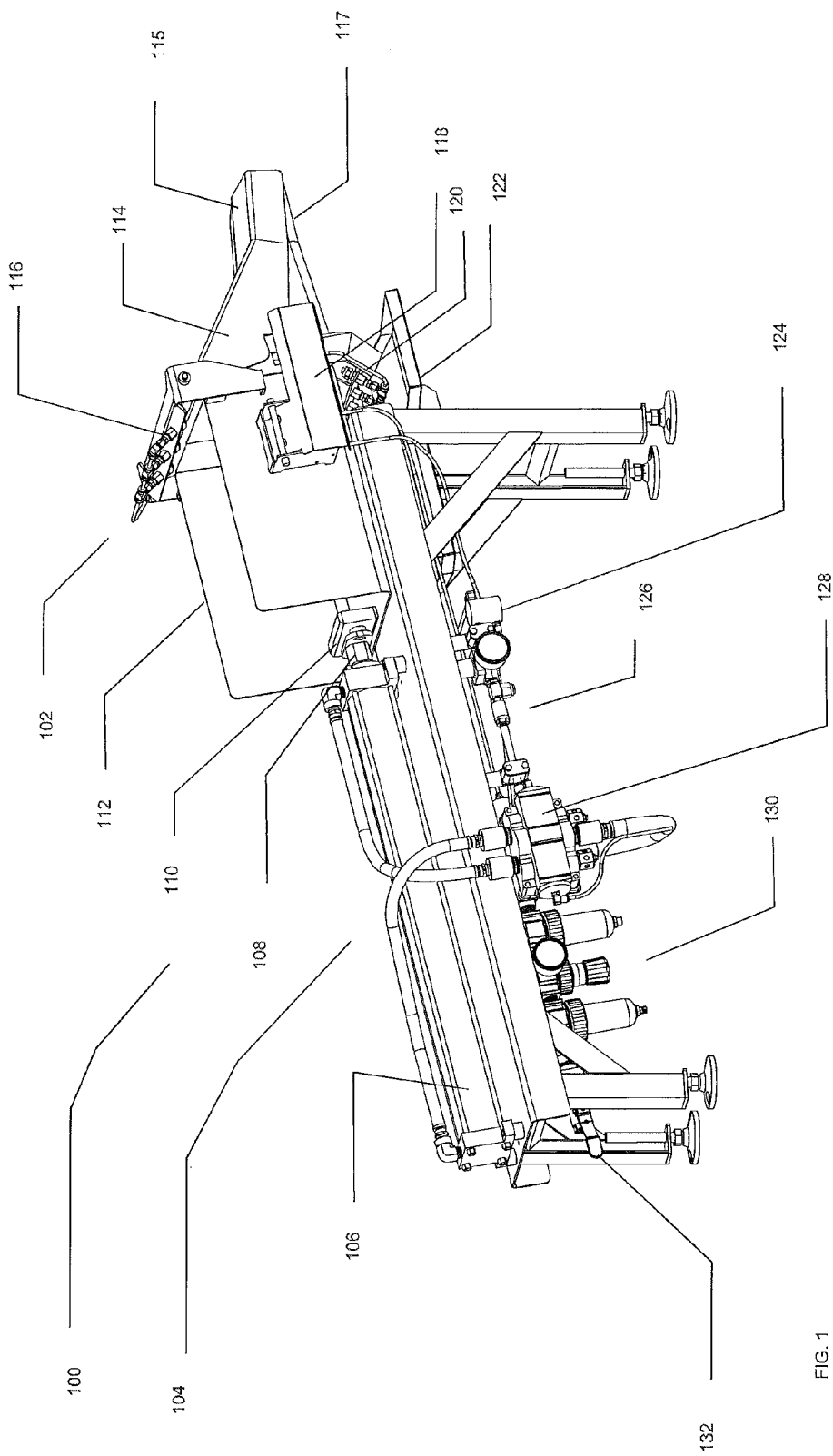

This invention relates generally to stuffing horns and, more particularly, to the extrusion of a meat product through a stuffing horn.

2. Background Art

A wide variety of products, such as food products, require processing before use by or sale to consumers. Generally, food products are processed in various combinations of a plurality of stages, for example marinating, cutting, deboning, breading, adding spices, cooking, dicing, brazing, searing, freezing, and packaging, and combinations thereof. In particular, a known processing system provides for the transportation of meat food products, such as chicken breasts or tenders, from a marinating tumbler to an oven. The product can also be a ground meat product or meat batter that can be formed into a final product having a particular shape or form factor after being extruded through a horn device and subsequently placed in a bag that is vacuum sealed. Alternatively a meat cut could be channeled through a horn device and into a sealed bag. This type of system can be a continuous food processing system whereby an edible food strand of meat or the like is extruded to be processed into a product or a desired meat cut could be provided. The product may have a coating material that may consist of a mixture or gel with a coagulatable protein, and reinforcing means. The exterior of the product is subject to contamination prior packaging.

The meat food products are deposited onto an uncovered oven belt or other conveyor belt as it is being processed, which can pass through an oven to cook the meat food products. In such a system, a plurality of uncovered conveyor belts can be used to transfer the meat food product from for example a marinating tumbler through a press belt and onto the oven belt. A plurality of operators can also be employed to ensure that the meat food products are evenly distributed on the conveyor in order to avoid pile up, reduce floor loss and on oven belts in order to cook the meat food products uniformly and thoroughly. Often along these conveyor paths, the meat product can be treated with a spray to reduce or eliminate pathogens.

Such an uncovered processing system, in which the food products are not transported in enclosed conduits, but rather, are exposed to the atmosphere between the various processing stages, which has several disadvantages. Disadvantages include, incorrect application of spray and unpredictable results.

Such a method is generally known. These known methods are being used for the extrusion of sausage or sausage-like materials or other protein based products. In principal this method involves the extrusion through an extrusion horn a product such as that of a sausage mix. Another embodiment is the channeling of a meat cut through a horn into a bag.

Existing equipment and processes have other shortcomings. Among these shortcomings are extruders which are complex and cannot be easily adjusted so that the diameter of the food strand can be easily adjusted. Conveyors used for the strand are open and invite unwanted lateral movement of the strand during movement through the conveyer trough, and contamination is possible. Conveyor systems combined with spray systems to reduce or eliminate pathogens can result inconsistent reduction and inconsistent spray application. Also, a spray system in combination with a conveyor system can result in post spray exposure to pathogens as the product continues along the conveyor path.

BRIEF SUMMARY OF INVENTION

One embodiment of the invention includes a stuffer horn with spray system for elimination or reduction of pathogen contamination. One embodiment of the invention combines a stuffer horn with spray nozzles for the application of a safety intervention solution while the product is being placed into a bag. The stuffer comprises a horn with pivoting top jaw and fixed bottom jaw that funnels product into a bag that is placed over its nose and a cylinder that forces the product through the horn and into the bag. There are two valves; one that is mechanically actuated by an operator control mechanization such as a mechanism that can be actuated by the operators knee, which in turn pilots the main valve that actuates the cylinder forcing product through the horn and into the bag. This knee actuated switch can also send a pilot signal to a diaphragm valve that actuates the spray solution.

The solution can be applied during the forward stroke of the cylinder while product is being loaded. The spray system can include a back flow preventer check valve, a 40 micron solution strainer, a pilot actuated diaphragm valve and a plurality of spray nozzles for example nine spray nozzles. The nozzles can be strategically placed to spray all surfaces of the product as it passes the spray zone within the entry area of the horn where with this embodiment, three spraying downward within the entry area, four spraying upward within the entry area, and one each on the sides spraying inward.

During operation the operator places a bag over the nose of the stuffer and actuates the knee valve; causing the cylinder to force the loaded product through the sprayed solution followed by placement into the bag for vacuum sealing. The operator can remove force on the knee valve causing the cylinder to retract to its initial position for loading. This embodiment is designed to reduce and eliminate pathogen contamination to all meat surfaces prior to product being placed into a bag. The system can be configured such that the amount of moisture pickup rate does not exceed any regulatory or governmental limit (for example, does not exceed 0.5% by weight). It is also necessary to control solution application rate based upon product size and to make the process repeatable.

This apparatus allows the topical application of a solution to the complete surface of meat products just prior the products being placed into a bag. This solution extends shelf life and prevents spoilage by inhibiting bacteria growth. The amount of solution applied is more exact and repeatable by having set cylinder speeds, solution working pressure, nozzle orifice size and speed of advancing product.

Spray systems consisting of a wire belt conveyor that transitioned product from a main table and through top and bottom spray bars before depositing product back onto the table have been utilized. Other spray systems that cover the top of product as it traverses down a conveyor have been utilized. Also, Table Top/Transition systems have been utilized that consist of a bottom spray bar that is placed at the junction of two conveyors that are at different elevations allowing product to fall past a spray system directed at the bottom of the product. This system can also be used in conjunction with a top spray system. These previous efforts only allowed the sprayed media to cover a portion of the product and were further upstream allowing more points of opportunity for bacteria to be picked up. Also, the combined Top and Transition spray systems that require conveyors with different elevations is problematic because multi-level conveyor systems of this type are not available in some facilities and would be costly to implement in an existing facility. Further, spray systems on conveyors are susceptible to inaccurate moisture application because of varying conveyor belt speeds, inconsistent product spray rates and product backup/pileup within spray zone.

One embodiment of the present invention integrates the stuffer horn with a spray system. Spraying as the product transitions through the horn and just prior entry in to the bag hinders post spray contamination and spraying within the horn assists in the elimination or reduction of contaminates within the horn. This embodiment of the invention allows the solution being sprayed to cover the entire product and acts as a last safety intervention before the product is placed into a tamper resistant vacuum sealed bag. Also, this technology allows a more exacting and repeatable application of the solution than other methods. One reason for the more exacting and repeatable application is due to the fact that the product can be processed through the horn in a singulated fashion. Singulation of the product allows for complete and repeatable application of the solution.

These and other advantageous features of the present invention will be in part apparent and in part pointed out herein below.

BRIEF DESCRIPTION OF THE DRAWINGS

For a better understanding of the present invention, reference may be made to the accompanying drawings in which:

FIG. 1 is a perspective view of the stuffer horn assembly;

FIG. 2 is a side plan view of the stuffer cylinder and horn with spray system;

FIG. 3 is a top view of the stuffer cylinder and horn with spray system;

FIG. 4, is a bottom view of the stuffer cylinder and horn with the spray system;

FIG. 5, is a front plan view of the stuffer cylinder and horn with the spray system;

FIG. 6, is a front perspective view of the horn with spray assembly;

FIG. 7, is a perspective view of a circular horn with spray assembly; and

FIG. 8, is a perspective view of a circular horn with spray assembly.

While the invention is susceptible to various modifications and alternative forms, specific embodiments thereof are shown by way of example in the drawings and will herein be described in detail. It should be understood, however, that the drawings and detailed description presented herein are not intended to limit the invention to the particular embodiment disclosed, but on the contrary, the intention is to cover all modifications, equivalents, and alternatives falling within the spirit and scope of the present invention as defined by the appended claims.

ITEMS

100 Stuffer Horn and Spray Assembly
102 Horn and Spray Assembly
104 Stuffer Assembly
106 Actuator Cylinder
108 Plunger Rod
110 Pusher Block
112 Horn Base Assembly
114 Horn Top Assembly
115 Horn Top Nose Exit End
116 Top Spray Assembly
117 Horn Bottom Nose Exit End
118 Knee Valve
120 Bottom Spray Assembly
122 Drip Pan
124 Solution Diaphragm Valve
126 Solution Assembly
128 Main Actuator Valve
130 Pneumatic Filter Regulator Lubricator
132 Pneumatic Isolation Valve
202 Bottom Spray Nozzle
204 Side Product Deflector
302 Union Tee
304 Top Spray Nozzle
306 Side Spray Assembly
308 Side Spray Nozzle
310 Side Spray Assembly
312 Side Spray Nozzle
402 Horn Base
502 Union Elbow Fitting
602 Nozzle Tube Connector
604 Nozzle Tube Connector
606 Nozzle Tube Bridge
608 Nozzle Tube Bridge
610 Nozzle Tube Bridge
612 Nozzle Tube Connector
614 Nozzle Tube Connector
616 Nozzle Tube Connector
618 Nozzle Tube Connector
620 Bottom Guide Rail
622 Bottom Guide Rail
700 Stuffer Horn and Spray Assembly
702 Stuffer Assembly
704 Horn and Spray Assembly
706 Actuator Cylinder
708 Plunger Rod
710 Pusher Block
712 Channeling Trough
714 Narrowing Horn End
716 Horn Entry Opening
718 Top Spray
720 Side Spray
802 Horn Exit Opening
804 Side Spray Assembly
806 Bottom Spray Assembly

DETAILED DESCRIPTION OF INVENTION

According to the embodiment(s) of the present invention, various views are illustrated in FIGS. 1-8 and like reference numerals are being used consistently throughout to refer to like and corresponding parts of the invention for all of the various views and figures of the drawing. Also, please note that the first digit(s) of the reference number for a given item or part of the invention should correspond to the Fig. number in which the item or part is first identified.

One embodiment of the present invention includes a stuffer horn and spray system, which teaches a novel apparatus and method for eliminating or reducing pathogen contamination. An embodiment of the spray stuffer horn can be configured to assist the operator with placing meat products into a vacuum sealable bag, while at the same time applying a solution to the entire surface of the product that inhibits or eliminates bacteria growth. The stuffer horn assembly can include a horn with pivoting top jaw and fixed bottom jaw that funnels product into a bag that is placed over its nose and a cylinder that forces the product through the horn and into the bag. One embodiment can include two pneumatic valves; one that is mechanically actuated by the operator's knee, which in turn pilots the main valve that actuates the cylinder forcing product through the horn and into the bag.

The product can be sprayed in one embodiment by nine spray nozzles. The nozzles can be placed to spray all surfaces of the product as it passes the spray zone with three spraying downward, four spraying upward, and one each on the sides spraying inward. The nozzles can be activated when a pilot signal from the knee valve is applied to the solution diaphragm valve. The spray system can be such that it is only activated during the forward stroke of the cylinder.

During operation, the operator can place a bag over the nose of the stuffer and actuate the knee valve when the operators use their knee to push a lever; causing the cylinder to force the loaded product through the spray zone followed by placement into the bag for vacuum sealing. The operator can remove force on the knee valve causing the cylinder to retract to its initial position for loading.

The air cylinder can be designed to prevent the rod from rotating during operation. This can be accomplished by adding a secondary internal rod that guides the piston as it travels. The cylinder can come equipped with cushions and/or internal bumpers to absorb dynamic forces at the end of stroke. Top set speed of the cylinder can be adjusted. Also the force of the cylinder can be controlled by the pressure regulator. For example, the operating pressure can be approximately 80 psi., but can be varied as needed. This control can also have an impact on cylinder speed.

The pusher block that is mounted to the end of the pusher assembly can be constructed of plastic or other compatible material. It may be desired to have the pusher in contact with the bottom guide rails on extension and just above or in slight contact with the bottom of the horn on retraction. To achieve this, washers can be used to shim both ends of the cylinder.

The spray system can be configured with components to control and apply the Topical Meat Intervention (TMI) solution. The spray system can be used to apply the TMI solution to all surfaces of the product as it passes through a spray zone. To increase the effectiveness of the TMI solution, the system can be designed such that a moisture pickup rate does not exceed regulatory limits (for example, does not exceed 0.5% by weight). Solution application rate can be controlled by solution pressure and fan nozzle orifice size. The solution working pressure can be for one embodiment at about approximately in the range of 10-45 psi and in another embodiment can be about approximately in the range of 25-35 psi. The TMI solution application rate is proportional to the solution working pressure; for example, an increase in pressure will increase the moisture pickup percentage. If it is not possible to achieve the desired moisture pickup percentage by adjusting working pressure, an embodiment can be to increase/decrease the fan nozzle orifice diameter. The speed of the plunger rod and pusher block can also be varied by adjusting the actuation of the cylinder.

The details of the invention and various embodiments can be better understood by referring to the figures of the drawing. Referring to FIG. 1, a perspective view of the stuffer horn assembly is shown. FIG. 1 illustrates a perspective view of the stuffer horn and spray assembly 100. The stuffer horn and spray assembly 100 includes a support platform on which the various components are mounted. The stuffer horn and spray assembly 100 includes two major subcomponents which are the horn and spray assembly 102 and the stuffer assembly 104. The stuffer assembly 104 includes an actuator cylinder 106, a plunger rod 108, and a pusher block 110. The actuator cylinder 106 is powered and actuated by a pneumatic filter regulator lubricator system 130 by way of a main actuator valve 128. The stuffer assembly 104 further includes a plunger rod 108 that can be actuated to extend outward in a telescopic fashion with respect to the cylinder body such that when it is actuated to extend outward the plunger rod pushes the pusher block 110 attached thereto to thereby push a product through the horn and spray assembly 102. The horn and spray assembly 102 includes a horn base assembly 112, a horn top assembly 114 and a horn top nose exit end 115 and a horn bottom nose exit end 117. The horn top assembly 114 can be retracted to pivot upward about a hinge attachment and away from the horn base assembly to thereby adjust the size of the horn nozzle having a horn top nose exit end 115 and a horn bottom nose exit end 117. Without departing from the scope of the invention, the horn can be a single piece unit or a multiple piece unit. The geometry of the horn can also vary without departing from the scope of the invention, for example the horn could be generally circular or cylindrical in form with a cylindrical central lengthwise channel formed by an out cylindrical wall and open on opposing distal ends of the cylinder. The implementation using a cylindrical horn can include a cylindrical horn constructed of thin flexible stainless material that is one continuous piece or that has a lengthwise overlapping seam where the diameter of the horn can be increased or reduced by flexing the material to either increase or reduce the overlap.

The horn top assembly, and the horn base assembly 112 are interfacing in a jaw-like fashion such that the horn top assembly and the horn base assembly interfaces in a jaw-like manner. The top spray assembly is positioned at the top of the horn assembly proximate the entry end and the spray is directed downward within the horn and in an positive angled manner toward an exit end of the horn such that a spray pattern can extend through a top opening of the jaw assembly. The top spray assembly is oriented such that it can effectively treat the top portion of any food product traveling through the spray zone. The bottom spray nozzle assembly 120 also proximate the entry end can be directed upward such that its spray pattern can be channeled through an opening in the bottom horn assembly and into the channel of the horn. Again, the bottom spray assembly can also have a positive angle toward the exit end.

A drip pan 122 can be utilized to capture any flow-off from the product. A solution assembly 126 in a solution diaphragm 124 can be utilized to provide a solution for treatment. Tubes can be communicably connected between the solution assembly 126 and the various spray assemblies and their respective spray nozzles. A main actuator valve 128 can be utilized to actuate the actuator cylinder 106 as well as provide pneumatic pressure for the solution assembly 126. A pressure filter, regulator and lubricator 130 can provide the appropriate pneumatic power for the system. There can also be a pneumatic isolation valve 132.

Referring to FIG. 2, a side plan view of the stuffer cylinder and horn with spray system is shown. FIG. 2 shows a side elevational view of the horn and spray assembly 102 and the stuffer assembly 104. The side view further reveals the top spray assembly 116 and also reveals the bottom spray 120 and the bottom spray nozzle 202. The side spray assembly is also shown including a side product deflector 204 for deflecting the food product as the food product travels through the horn's spray zone. Again, the horn top assembly 114 can pivot upward about an hinge assembly such that the top and bottom horn portions interface in a jaw-like manner.

Referring to FIG. 3, a top view of the stuffer cylinder and horn with spray system is shown. FIG. 3 illustrates a top view of the horn and spray assembly 102 and the stuffer assembly 104. This view further reveals the top view of the spray assembly 116 which includes plurality of top spray nozzles 304 connected to a fluid source by a union T 302. This top view also reveals the side spray assemblies 306 and 310 and further reveals the side spray nozzles 308 and 312. The side spray nozzle can be oriented in a manner to apply fluid to the side portions of the product traveling through the spray zone. A deflector can be utilized as needed as shown in FIG. 2 item 204 to deflect the product spray media in a manner that it causes the spray pattern to cover the side portion of the product.

Figure 4:
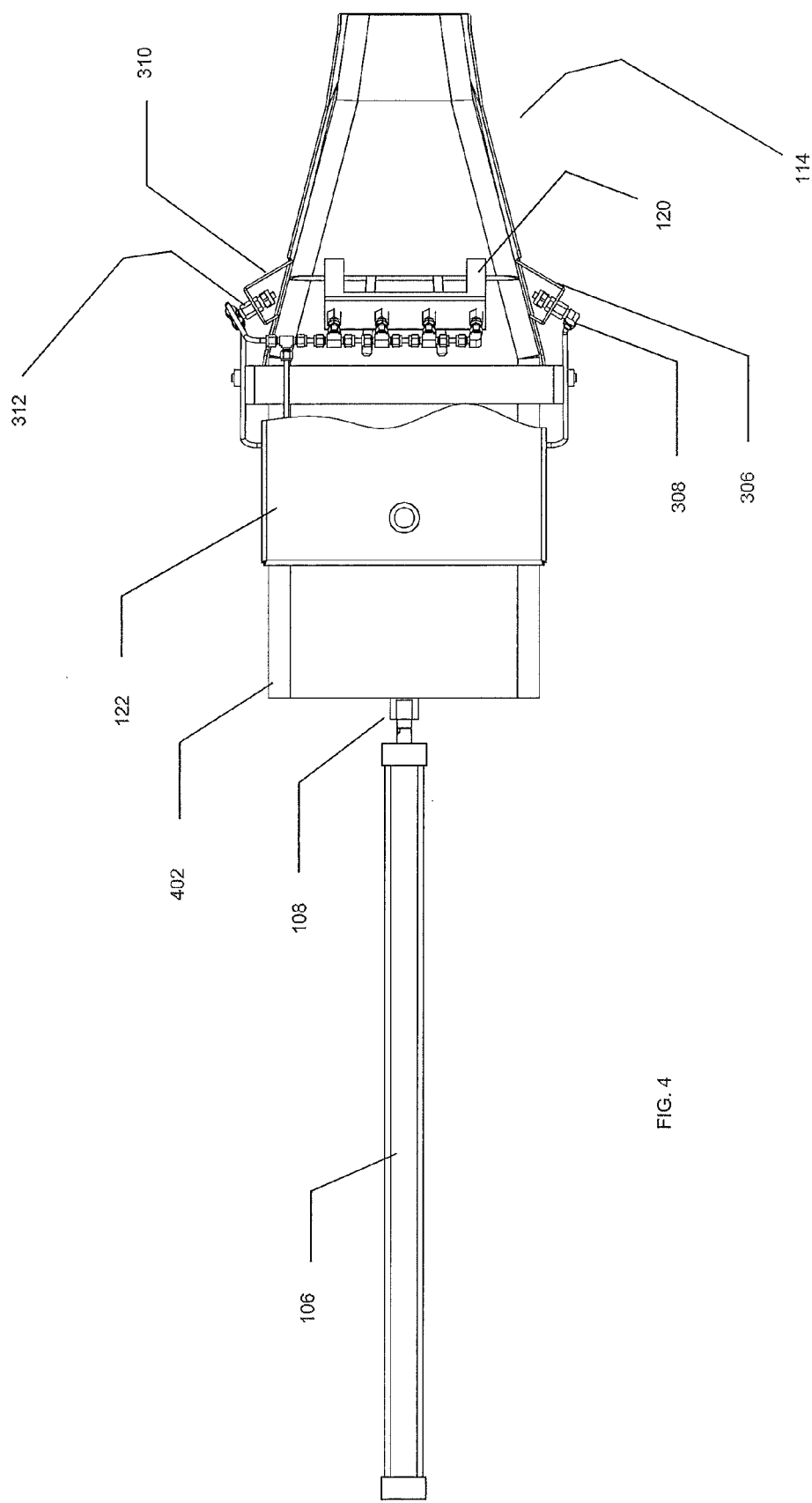

Referring to FIG. 4, is a bottom view of the stuffer cylinder and horn with the spray system is shown. FIG. 4 illustrates a bottom view of the horn and spray assembly 102 and the stuffer assembly 104. The bottom view reveals the horn base 402 as well as provide any further view of the bottom spray assembly 120. The side spray assemblies 310 and 306 further illustrate the side spray assemblies.

Figure 5:
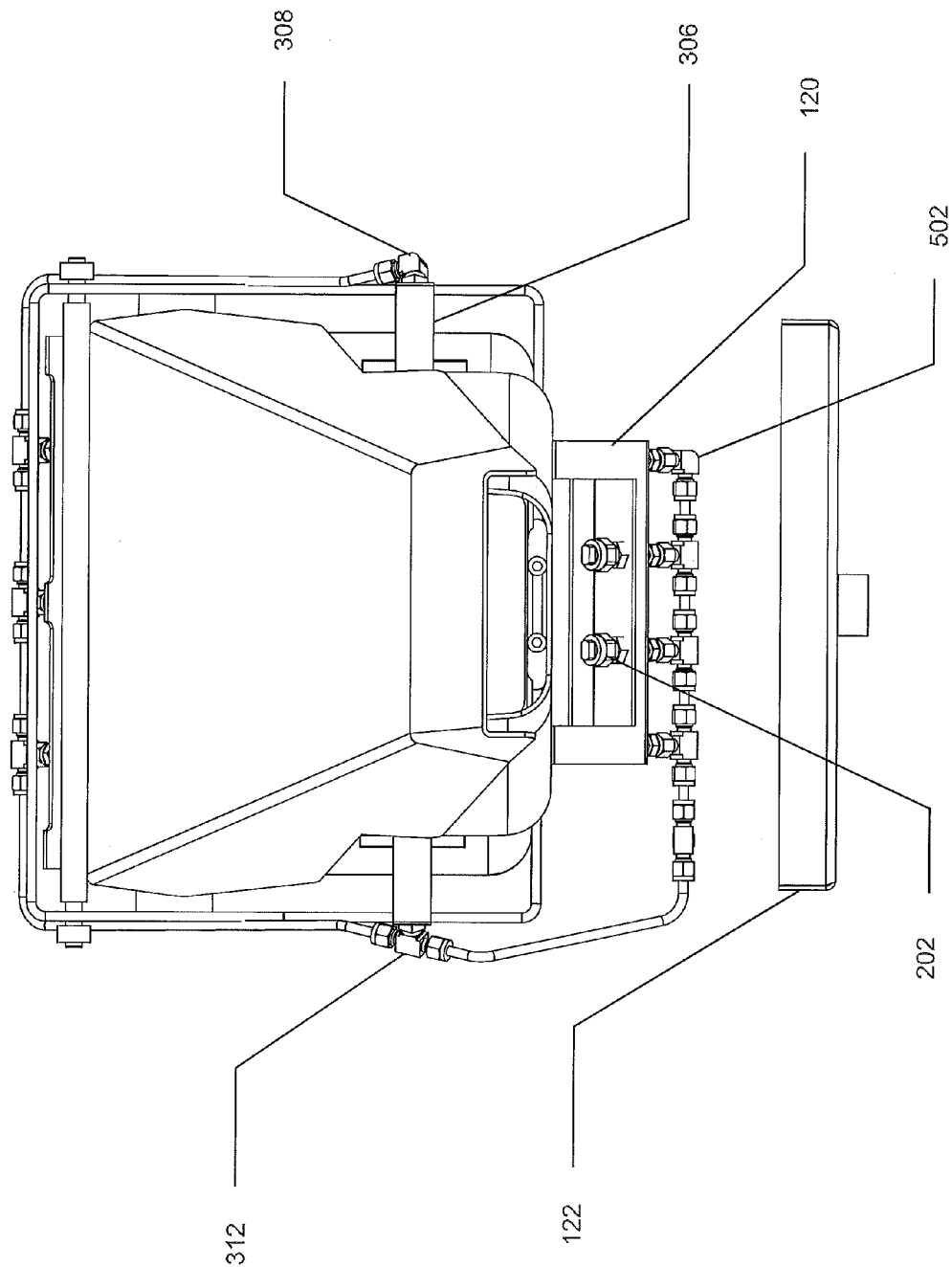

Referring to FIG. 5, a front plan view of the stuffer cylinder and horn with the spray system is shown. FIG. 5 illustrates a front elevation view of the horn and spray assembly 102. The bottom spray assemblies 120 and the side spray assemblies 308 and 312 are further revealed.

Figure 6:
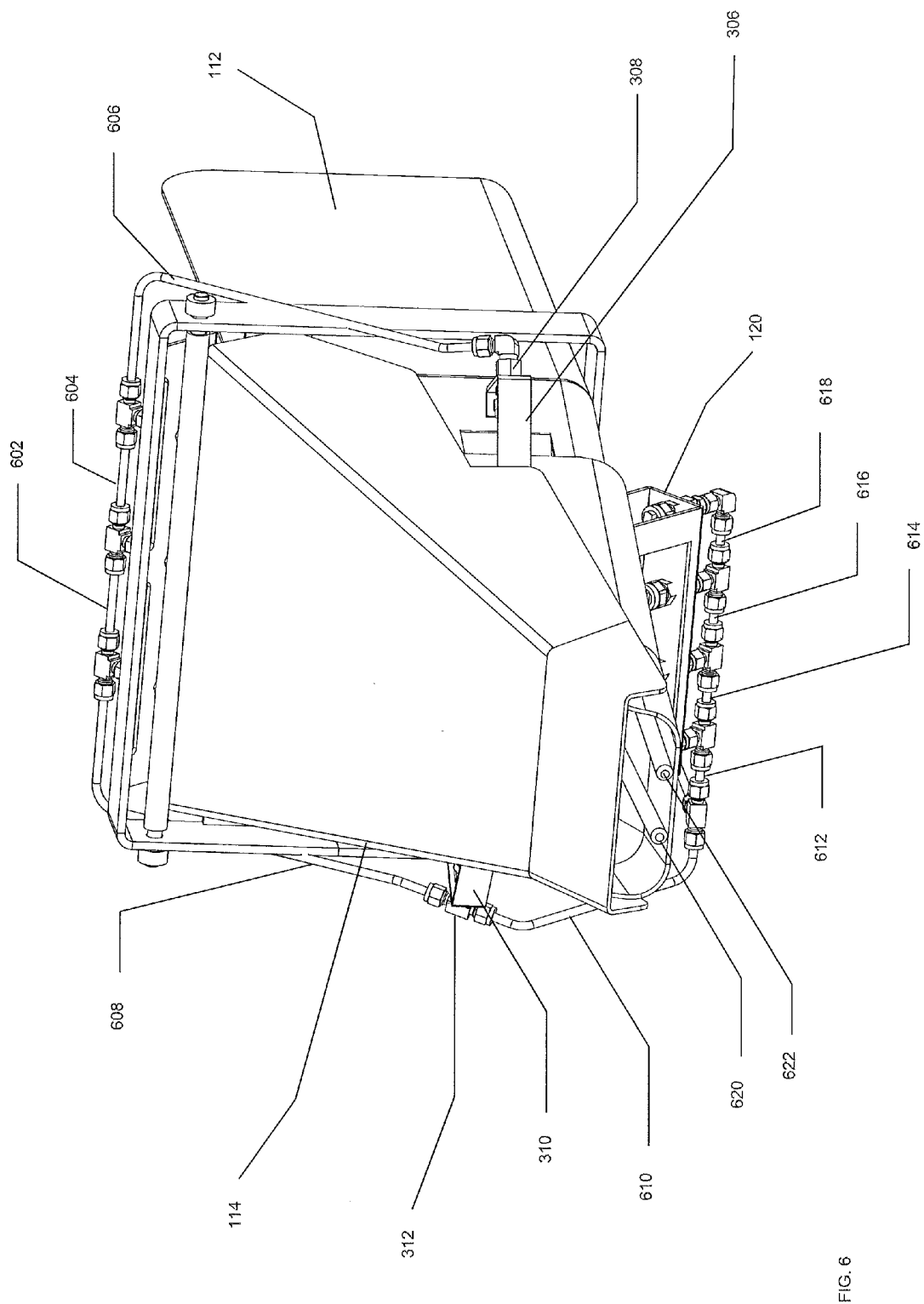

Referring to FIG. 6, a front perspective view of the horn with spray assembly is shown. FIG. 6 illustrates a front perspective view of the horn assembly. This view further reveals the various tubing that interconnects the spray nozzles with the fluid source as well as providing fluid to the various spray nozzles. There are various fluid tubes shown in FIG. 6 that reveal the interconnection between the various different spray nozzles which are illustrated by item 602 through 622 for interconnecting the various components. Within the base portion of the horn there can be bottom guide rails 620 and 622 for the purpose of guiding the pusher rod 108 and the pusher block 110. In one embodiment, rather than bottom guide rails, there can be lengthwise raised ribs protruding upward from the base portion.

Figure 7:
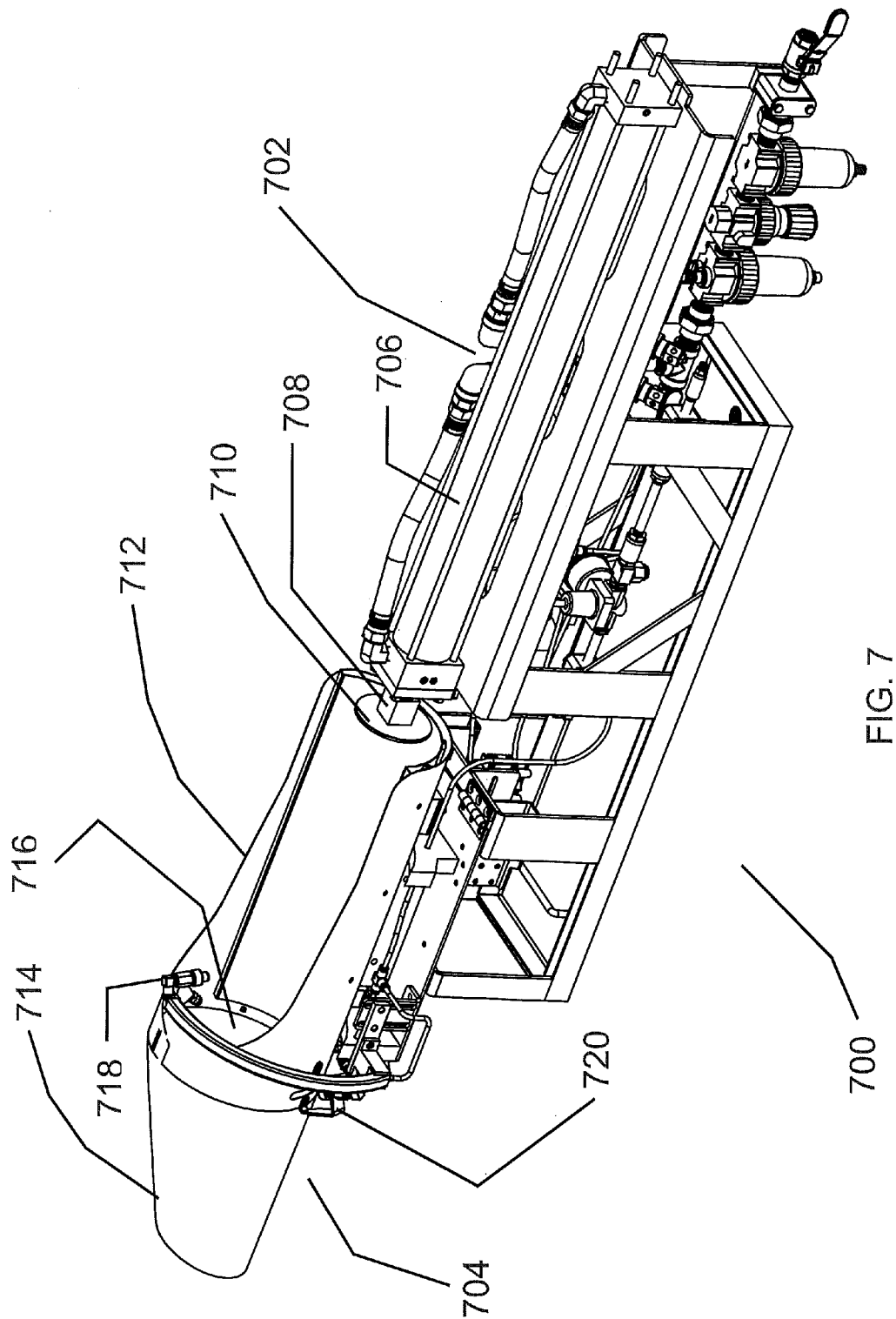

Referring to FIG. 7, a perspective view of a circular horn with spray assembly is shown. FIG. 7 illustrates a perspective view of the stuffer horn and spray assembly 700. The stuffer horn and spray assembly 700 includes a support platform on which the various components are mounted. The stuffer horn and spray assembly 700 includes two major subcomponents which are the horn and spray assembly 704 and the stuffer assembly 702. The horn and spray assembly can include a channeling trough 712 for channeling the product to the narrowing horn end 714. The stuffer assembly 702 includes an actuator cylinder 706, a plunger rod 708, and a pusher block 710. The actuator cylinder 706 is powered and actuated by a pneumatic compressor system by way of a main actuator valve. The stuffer assembly 702 further includes a plunger rod 708 that can be actuated to extend outward with respect to the cylinder body such that when it is actuated to extend outward the plunger rod pushes the pusher block 710 attached thereto to thereby push a product through the horn and spray assembly 704. Without departing from the scope of the invention, the horn can be a single piece unit or a multiple piece unit. The geometry of the horn can also vary without departing from the scope of the invention, for example the horn could be generally cylindrical in form with a cylindrical central lengthwise channel formed by an outer cylindrical wall and open on opposing distal ends of the cylinder. The implementation using a cylindrical horn can include a cylindrical horn where the outer cylindrical wall is constructed of a thin flexible stainless material or similar material that is one continuous piece or that has a lengthwise overlapping seam where the diameter of the horn can be increased or reduced by flexing the material to either increase or reduce the overlap of end edges of the material forming the outer cylindrical wall.

The top spray assembly 718 is positioned at the top of the horn assembly proximate the narrowing horn entry opening 716 and the spray is directed downward within the horn and in an positive angled manner toward an exit end of the horn such that a spray pattern can extend through a top opening of the jaw assembly. The top spray assembly is oriented such that it can effectively treat the top portion of any food product traveling through the spray zone. The bottom spray nozzle assembly (not shown in this view) also proximate the entry end can be directed upward such that its spray pattern can be channeled through an opening in the horn assembly and into the channel of the horn. Again, the bottom spray assembly can also have a positive angle toward the exit end. The side spray nozzle assembly 720 also proximate the entry end can be directed inward and forward such that its spray pattern can be channeled through an opening in the horn assembly and into the channel of the horn.

A main actuator valve can be utilized to actuate the actuator cylinder as well as provide pneumatic pressure for the solution assembly. A pneumatic compressor can provide the appropriate pneumatic power for the system. The pneumatic compressor can also have a pneumatic isolation valve.

Figure 8:
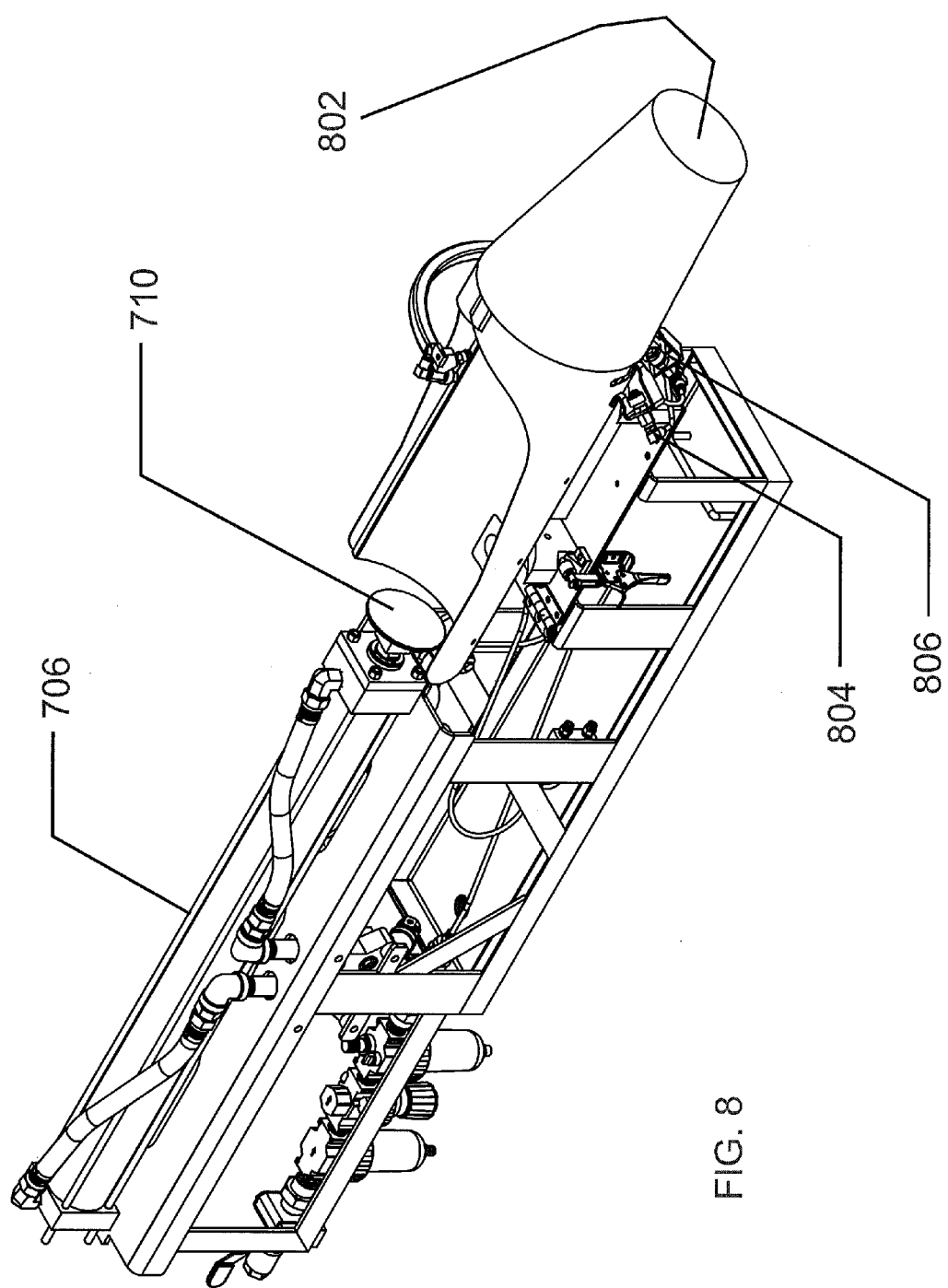

Referring to FIG. 8, a perspective view of a circular horn with spray assembly is shown. The horn exit opening 802 through which the product exits is shown. The opposing side spray assembly 804 is also shown. Also, the lower spray assembly 806 is also shown and there can be another lower spray assembly (not shown) on the opposing side of the horn below the side spray assembly 720.

One embodiment of the invention for reduction of pathogens includes a horn assembly 102 having a top horn assembly portion 114 hingedly attached to and closable over an opposed bottom horn assembly portion 112 in a jaw-like manner such that when said top horn assembly portion is closed over said bottom horn assembly portion a central horn channel is formed having an open entry end and an open exit end. A plurality of liquid spray assemblies including a top spray assembly adapted can be oriented to emit a spray from a top area of the central horn channel downward into the central horn channel. A bottom spray assembly can be adapted and oriented to emit a spray from a bottom area of the central horn channel upward into the central horn channel. Opposing side spray assemblies can be adapted and oriented to emit a spray from opposing side areas of the central horn channel laterally into the central horn channel, where said plurality of liquid spray assemblies create a spray zone within the central horn channel.

An actuator cylinder 106 can have a telescopically extendable plunger rod 108 proximate the entry end of the central horn channel, where said plunger rod can be extendable from the entry end of the central horn channel, through the spray zone and toward the exit end. The plurality of spray assemblies can include a plurality of spray nozzles in fluid communication with a pressurized topical meat intervention solution assembly 126 adapted to provide pressurized topical meat intervention solution to the nozzles.

The top horn assembly portion and the bottom horn assembly portion are adapted open and close or to pivotally traverse along a range of motion between an open position and a closed position. An actuator valve having an actuator mechanization adapted to be actuated by an operator where when actuated pilots the actuator cylinder to telescopically extend the plunger rod and the plurality of liquid spray assemblies to emit a liquid spray pattern.

In one embodiment the top spray assembly, the bottom spray assembly and the opposing side spray assemblies can be positively angled toward the exit end of the central horn channel. Also, at least one of the top spray, bottom spray and opposing side spray assemblies can include a product deflector 204. The horn assembly and the central horn channel can progressively narrow from the entry end to the exit end for directing a product into a bag. As discussed above the central horn channel formed by the horn wall can have a different geometry, for example generally cylindrical without departing from the scope of the invention. The apparatus can also include a drip pan positioned beneath the horn assembly for capturing excess fluid.

In yet another embodiment the horn can be a single piece unit or a multiple piece unit. The geometry of the horn can also vary without departing from the scope of the invention, for example the horn could be generally cylindrical in form with a cylindrical central lengthwise channel formed by an out cylindrical wall and open on opposing distal ends of the cylinder. The horn can be conical in form in that it can narrow from the entry end toward the more narrow exit end. The implementation using a cylindrical horn can include a cylindrical horn where the outer cylindrical wall is constructed of a thin flexible stainless material or similar material that is one continuous piece or that has a lengthwise overlapping seam where the diameter of the horn can be increased or reduced by flexing the material to either increase or reduce the overlap of end edges of the material forming the outer cylindrical wall. The implementation of the horn can be such that the outer geometry forms a frustum or a truncated cone where the diameter narrows from the entry end to the exit end.

The various stuffer horn with spray system examples shown above illustrate method and apparatus for eliminating or reducing pathogen contamination. A user of the present invention may choose any of the above stuffer horn with spray system embodiments, or an equivalent thereof, depending upon the desired application. In this regard, it is recognized that various forms of the subject stuffer horn with spray system could be utilized without departing from the spirit and scope of the present invention.

As is evident from the foregoing description, certain aspects of the present invention are not limited by the particular details of the examples illustrated herein, and it is therefore contemplated that other modifications and applications, or equivalents thereof, will occur to those skilled in the art. It is accordingly intended that the claims shall cover all such modifications and applications that do not depart from the spirit and scope of the present invention.

Other aspects, objects and advantages of the present invention can be obtained from a study of the drawings, the disclosure and the appended claims.

What is claimed is:

1. An apparatus for reduction of pathogens comprising:
a horn assembly having upper, lower and side walls forming a central horn channel having an open entry end and an open exit end;
a plurality of liquid spray assemblies positioned about the central horn channel and oriented to emit an inward multi-directional spray pattern into the central horn channel, where said plurality of liquid spray assemblies create a spray zone;
and
an plunger rod proximate the entry end of the central horn channel, where said plunger rod is extendable from the entry end of the central horn channel, through the spray zone toward the exit end.

2. The apparatus as recited in claim 1, where the plurality of spray assemblies include a plurality of spray nozzles in fluid communication with a pressurized topical meat intervention solution assembly adapted to provide pressurized topical meat intervention solution to the nozzles.

3. The apparatus as recited in claim 2, where the inward multi-directional spray pattern includes a downward directional spray, an upward directional spray and laterally opposing directional spray patterns.

4. The apparatus as recited in claim 3, where the plunger rod has a pusher block attached to a leading end of the plunger rod and aligned to travel along and between parallel guide rails.

5. The apparatus as recited in claim 3, where the downward, upward and lateral directional spray patterns are positively angled toward the exit end.

6. The apparatus as recited in claim 3, where at least one of the plurality of spray assemblies includes a product spray media deflector.

7. The apparatus as recited in claim 3, where the central horn channel is progressively narrowed toward the exit end for channeling product into a bag.

8. An apparatus for reduction of pathogens comprising:
a horn assembly having a top horn assembly portion hingedly attached to and closable over an opposed bottom horn assembly portion in a jaw-like manner such that when said top horn assembly portion is closed over said bottom horn assembly portion a central horn channel is formed having an open entry end and an open exit end;
a plurality of liquid spray assemblies including a top spray assembly adapted and oriented to emit a spray from a top area of the central horn channel downward into the central horn channel, a bottom spray assembly adapted and oriented to emit a spray from a bottom area of the central horn channel upward into the central horn channel, an opposing side spray assemblies adapted and oriented to emit a spray from opposing side areas of the central horn channel laterally into the central horn channel, where said plurality of liquid spray assemblies create a spray zone;
and
an actuator cylinder having an extendable plunger rod proximate the entry end of the central horn channel, where said plunger rod is extendable from the entry end of the central horn channel, through the spray zone toward the exit end.

9. The apparatus as recited in claim 8, where the plurality of spray assemblies include a plurality of spray nozzles in fluid communication with a pressurized topical meat intervention solution assembly adapted to provide pressurized topical meat intervention solution to the nozzles.

10. The apparatus as recited in claim 9, where the top horn assembly portion and the bottom horn assembly portion are adapted to pivotally traverse along a range of motion between an open position and a closed position.

11. The apparatus as recited in claim 9, further comprising:
an actuator valve having an actuator mechanization adapted to be actuated by an operator where when actuated pilots the actuator cylinder to telescopically extend the plunger rod and the plurality of liquid spray assemblies to emit a liquid spray pattern.

12. The apparatus as recited in claim 9, where top spray assembly, the bottom spray assembly and the opposing side spray assemblies are positively angled toward the exit end of the central horn channel.

13. The apparatus as recited in claim 12, where at least one of the top spray, bottom spray and opposing side spray assemblies includes a spray deflector.

14. The apparatus as recited in claim 9, where the horn assembly and the central horn channel progressively narrows from the entry end to the exit end.

15. The apparatus as recited in claim 9, further comprising a drip pan positioned beneath the horn assembly for capturing excess fluid.

16. An apparatus for reduction of pathogens comprising:
   a horn assembly having upper, lower and side walls forming a central horn channel having an open entry end and an open exit end;
   a plurality of liquid spray assemblies including a top spray assembly adapted and oriented to emit a spray from a top area of the central horn channel downward into the central horn channel, a bottom spray assembly adapted and oriented to emit a spray from a bottom area of the central horn channel upward into the central horn channel, an opposing side spray assemblies adapted and oriented to emit a spray from opposing side areas of the central horn channel laterally into the central horn channel, where said plurality of liquid spray assemblies create a spray zone;
   and
   an plunger rod proximate the entry end of the central horn channel, where said plunger rod is extendable from the entry end of the central horn channel, through the spray zone toward the exit end.

17. The apparatus as recited in claim 16, where the plurality of spray assemblies include a plurality of spray nozzles in fluid communication with a pressurized topical meat intervention solution assembly adapted to provide pressurized topical meat intervention solution to the nozzles.

18. The apparatus as recited in claim 17, further comprises:
   a top horn assembly portion hingedly attached to and closable over an opposed bottom horn assembly portion in a jaw-like manner such that when said top horn assembly portion is closed over said bottom horn assembly portion a central horn channel is formed having the open entry end and the open exit end; and
   where the top horn assembly portion and the bottom horn assembly portion are adapted to pivotally traverse along a range of motion between an open position and a closed position.

19. The apparatus as recited in claim 18, further comprising:
   an actuator valve having an actuator mechanization adapted to be actuated by an operator where when actuated pilots the actuator cylinder to telescopically extend the plunger rod and the plurality of liquid spray assemblies to emit a liquid spray pattern.

20. An method for reduction of pathogens comprising the steps of:
   traversing a product through an open entry end and an open exit end of a central horn channel of a horn assembly having upper, lower and side walls forming said central horn channel by extending a plunger rod from proximate the open entry end of the central horn channel;
   extending the plunger rod and traversing the product from the entry end of the central horn channel, through a spray zone within the central horn channel toward the exit end; and
   emitting a topical meat intervention solution spray from a plurality of liquid spray assemblies positioned about the central horn channel and oriented to emit an inward multi-directional spray pattern into the central horn channel, where said plurality of liquid spray assemblies create the spray zone as the product traverses through the spray zone.

\* \* \* \* \*